United States Patent [19]

Tsuchida et al.

[11] 3,909,353

[45] Sept. 30, 1975

[54] METHOD OF PRODUCING L-PHENYLALANINE BY FERMENTATION

[75] Inventors: Takayasu Tsuchida, Kawasaki; Hiroshi Matsui, Yokohama; Hitoshi Enei, Zushi; Fumihiro Yoshinaga, Fujisawa, all of Japan

[73] Assignee: Ajinomoto Co., Inc., Tokyo, Japan

[22] Filed: July 18, 1974

[21] Appl. No.: 489,805

Related U.S. Application Data

[63] Continuation-in-part of Ser. No. 447,584, March 4, 1974, abandoned.

[30] Foreign Application Priority Data

Mar. 12, 1973 Japan................................ 48-28728

[52] U.S. Cl. ................................................ 195/29
[51] Int. Cl.² .......................................... C12D 13/06
[58] Field of Search .................... 195/29, 28, 30, 47

[56] References Cited

UNITED STATES PATENTS 3,660,235   5/1972   Okumura et al...................... 195/29

*Primary Examiner*—A. Louis Monacell
*Assistant Examiner*—Robert J. Warden
*Attorney, Agent, or Firm*—Hans Berman; Kurt Kelman

[57] ABSTRACT

Tyrosine-requiring mutant strains of Brevibacterium lactofermentum and Brevibacterium flavum which are capable of vigorous growth on culture media containing enough of a tryptophan analog to suppress growth of the parent strain and also capable of vigorous growth on media containing enough phenylalanine analog to suppress growth of the parent strain, produce more phenylalanine by aerobic fermentation of generally conventional aqueous media than the best phenylalanine-producing related microorganisms available heretofore.

8 Claims, No Drawings

METHOD OF PRODUCING L-PHENYLALANINE BY FERMENTATION

This application is a continuation-in-part of our co-pending application Ser. No. 447,584, filed on Mar. 4, 1974, and now abandoned.

This invention relates to the production of L-phenylalanine by microbial fermentation, and particularly to a method of producing L-phenylalanine by means of newly discovered microorganisms.

It is known from the Japanese patent publication No. 6345/1962 that a tyrosine-requiring mutant of Micrococcus glutamicus accumulates phenylalanine in the culture medium in which it grows. Mutants of Brevibacterium and Corynebacterium resistant to phenylalanine analogs have been disclosed in U.S. Pat. No. 3,660,235 to produce economically useful amounts of phenylalanine. The best microbial phenylalanine producer known heretofore was a tyrosine-requiring mutant of Corynebacterium resistant to phenylalanine analogs which was described in the published German Pat. application No. 2,137,071 to produce 1.68 g/dl phenylalanine from a medium containing 15 g/dl sucrose.

It has now been found that L-phenylalanine is accumulated in even higher concentrations in cultures of certain tyrosine-requiring, artificially induced mutant strains of Brevibacterium whose growth is not inhibited by tryptophan analogs nor by phenylalanine analogs in concentrations sufficient substantially completely to inhibit the growth of the respective parent strains showing neither the tyrosine requirement nor the resistance to tryptophan or phenylalanine analogs.

The mutants are derived from the parent strains by mutagenic doses of ionizing radiation (ultra-violet, X-rays, gamma rays) or of chemical agents (sodium nitrite, N-methyl-N'-nitro-N-nitrosoguanidine, diethyl sulfate), and by screening the treated parent strains for mutants having the desired properties. Tyrosine-requiring mutants are isolated by the replication method, and the tyrosine-requiring strains resistant to phenylalanine analogs and tryptophan analogs are identified by their ability of growing vigorously on otherwise conventional media containing enough of the analogs to suppress or virtually suppress growth of the parent strains.

Comparison between the parent and the mutants is made by determining the relative growth for each tested strain in the presence of the analog, relative growth being the percentage of the growth observed in the absence of the analog. The analogs are chemically analogous to phenylalanine and tryptophan respectively, they inhibit the growth of many microorganisms, and this inhibition can be overcome at least in part by phenylalanine and tryptophan respectively.

Commonly known phenylalanine analogs include β-amino-β-phenylpropionic acid, o-fluorophenylalanine, m-fluorophenylalanine, p-fluorophenylalanine, β-2-thienylalanine, β-3-thienylalanine, β-2-furylalanine, β-3-furylalanine, o-aminophenylalanine, p-aminophenylalanine, m-aminophenylalanine, α-amino-β-phenylethanesulfonate, β-2-pyrrolalanine, 1-cyclopentene-1-alanine, 1-cyclohexene-1-alanine, β-4-pyridylalanine, β-4-pyrazolylalanine, p-nitrophenylalanine, β-4-thiazolealanine, cyclohexylalanine, 2-amino-4-methyl-4-hexenoic acid, S-(1,2-dichlorovinyl)-cysteine, o-chlorophenylalanine, m-chlorophenylalanine, p-chlorophenylalanine, o-bromophenylalanine, m-bromophenylalanine, p-bromophenylalanine, m-fluorotyrosine, 3-nitrotyrosine, β-phenylserine, and 3-iodotyrosine.

Known tryptophan analogs include 6-methyltryptophan, 4-methyltryptophan, naphthylalanines, indoleacrylic acid, naphthylacrylic acid, β-(2-benzothienyl)-alanine, styrylacetic acid, α-amino-β-3-indazole-3-yl-propionic acid, 5-fluorotryptophan, 6-fluorotryptophan, 4-flurotryptophan, and 7-azatryptophan.

It has been found that mutants of Brevibacterium which resist one phenylalanine analog also resist other phenylalanine analogs, and that a similar relationship exists with respect to tryptophan-resistant mutant strains.

The aqueous fermentation media in which the mutants of the invention produce L-phenylalanine are largely conventional. They must contain sources of assimilable carbon and nitrogen and tyrosine, and should further contain inorganic ions and minor organic nutrients. Suitable carbon sources may be glucose, fructose, sucrose, starch hydrolyzate, molasses, ethanol, propanol, glycerol, acetic acid, benzoic acid, propionic acid, and higher fatty acids. Nitrogen may be derived from nitrates, ammonium salts, ammonium hydroxide, urea, and like inorganic and organic compounds.

Aerobic conditions are maintained by aeration and/or agitation, and pH is held between 5 and 9 for good yields. When ammonia is used for pH control, it may also serve as a nitrogen source. The phenylalanine concentration in the broth reaches its maximum within 2 to 7 days if the fermentation is carried out at 24° to 37°C.

The phenylalanine concentrations reported hereinbelow were determined by bio-assay employing Leuconostoc citrovorum. Microorgnisms identified by FERM P-numbers are available from the Fermentation Research Institute of the Agency of Industrial Science & Technology, Chiba-shi, Chiba-ken, Japan, and those identified by ATCC numbers were obtained from the American Type Culture Collection in Rockville, Md.

The following Examples further illustrate the invention.

EXAMPLE 1

Brevibacterium lactofermentum No. 2256 (ATCC 13869) was exposed to 250 γ/ml N-methyl-N'-nitro-N-nitrosoguanidine and five tyrosine-requiring, phenylalanine-producing mutant strains were isolated. Strain AJ 3435 (FERM P-1912) did not show more resistance to phenylalanine or tryptophan analogs than the parent. Strain AJ 3436 (FERM P-1913) resisted p-fluorophenylalanine. Strain AJ 3432 (FERM P-1844) resisted 5-methyltryptophan. The strains AJ 3437 (FERM P-1914) and AJ 3699 (FERM P-2476) resisted both p-fluorophenylalanine and 5-methyl-tryptophan. Strain AJ 3699, in addition to tyrosine, required tryptophan and methionine for its growth.

An aqueous culture medium was prepared to contain 20 g/l glucose, 2.0 g/l urea, 1.5 g/l $(NH_4)_2SO_4$, 1.0 g/l $KH_2PO_4$, 3.0 g/l $K_2HPO_4$, 0.1 g/l $MgSO_4.7H_2O$, 50 μg/l biotin, 100 μg/l thiamine.HCL, 0.15 g/l L-tyrosine, 0.3 g/l L-methionine, 10 mg/l $FeSO_4.7H_2O$, and 10 mg/l $MnSO_4.7H_2O$, and adjusted at pH 7.0. 3 ml Batches of the aqueous medium were placed in 10 ml test tubes together with the amounts of p-fluorophenylalanine (PFP) shown in Table 1. Each batch was inoculated with 15 × 10⁷ cells of the microorganisms listed in the Table and held at 30°C for 24 hours. The culture medium for strain AJ 3699 additionally contained 0.1 g/l L-tryptophan. The relative growth, as defined above, was then determined and is indicated in Table 1.

TABLE 1

| PFP µg/ml | Relative growth, % | | | |
|---|---|---|---|---|
| | No. 2256 | AJ3436 | AJ3437 | AJ3699 |
| 100 | 98 | 100 | 100 | 100 |
| 200 | 96 | 98 | 98 | 100 |
| 400 | 95 | 95 | 90 | 93 |
| 600 | 45 | 90 | 90 | 87 |
| 800 | 0 | 83 | 80 | 80 |
| 1000 | 0 | 80 | 78 | 75 |

Analogous tests were performed with 5-methyltryptophan (MT), and the results are shown in Table 2.

TABLE 2

| MT µg/ml | Relative growth, % | | | |
|---|---|---|---|---|
| | No. 2256 | AJ 3432 | AJ 3437 | AJ 3699 |
| 50 | 85 | 100 | 100 | 100 |
| 100 | 0 | 98 | 100 | 98 |
| 200 | 0 | 95 | 95 | 94 |
| 300 | 0 | 90 | 95 | 92 |
| 400 | 0 | 90 | 90 | 90 |

Phenylalanine and tryptophan analogs were tested for their effects on strains No. 2256 and AJ 3437 at concentrations up to 5000 γ/ml. The relative growth values for AJ 3437 are shown in Table 3.

TABLE 3

| | Relative growth,%, at γ/ml | | | | | |
|---|---|---|---|---|---|---|
| | 50 | 200 | 500 | 1000 | 3000 | 5000 |
| p-Fluorophenylalanine | 100 | 98 | 90 | 78 | 40 | 20 |
| m-Fluorophenylalanine | 80 | 65 | 40 | 33 | 26 | 20 |
| β-Phenylserine | 98 | 80 | 90 | 90 | 60 | 45 |
| m-Fluorotyrosine | 100 | 98 | 54 | 36 | 17 | 14 |
| 3-Nitrotyrosine | 100 | 100 | 100 | 100 | 86 | 71 |
| 3-Iodotyrosine | 100 | 98 | 95 | 95 | 86 | 77 |
| 5-Methyltryptophan | 100 | 95 | 88 | 20 | 0 | 0 |
| 6-Fluorotryptophan | 90 | 85 | 57 | 43 | 29 | 23 |
| 5-Fluorotryptophan | 85 | 50 | 14 | 15 | 7 | 0 |

The amounts of the compounds listed in Table 3 which reduced relative growth of strain No. 2265 to zero were, in γ/ml and in the order in which they appear in Table 3, 1000, 200, 5000, 500, 3000, 3000, 200, 200, 200.

EXAMPLE 2

Brevibacterium flavum No. 2247 (ATCC 14067) was exposed to 250 γ/ml N-methyl-N'-nitro-N-nitrosoguanidine, and four tyrosine-requiring, phenylalanine-producing strains were isolated. Strain AJ 3695 (FERM P-2472) resisted neither phenylalanine nor tryptophan analogs better than the parent. Strains AJ 3696 (FERM P-2473) and AJ 3697 (FERM P-2474) resisted p-fluorophenylalanine and 5-methyltryptophan respectively. Strain AJ 3698 (FERM P-2475) was resistant to both analogs as is illustrated in Tables 4 and 5 whose results were arrived at in the same manner as those listed in Tables 1 and 2 above.

TABLE 4

| PFP µg/ml | Relative growth, % | | |
|---|---|---|---|
| | No. 2247 | AJ 3696 | AJ 3698 |
| 100 | 100 | 100 | 100 |
| 200 | 98 | 100 | 97 |
| 400 | 84 | 95 | 95 |
| 600 | 41 | 98 | 90 |
| 800 | 0 | 83 | 88 |
| 1000 | 0 | 85 | 75 |

TABLE 5

| MT µg/ml | Relative growth, % | | |
|---|---|---|---|
| | No. 2247 | AJ 3697 | AJ 3698 |
| 50 | 83 | 100 | 98 |
| 100 | 0 | 95 | 94 |
| 200 | 0 | 83 | 80 |
| 300 | 0 | 75 | 68 |
| 400 | 0 | 28 | 30 |
| 500 | 0 | 3 | 12 |

EXAMPLE 3

An aqueous culture medium was prepared to contain, per deciliter, 13 g glucose, 1.0 g $(NH_4)_2SO_4$, 0.15 g $KH_2PO_4$, 0.4 g $MgSO_4.7H_2O$, 5.0 µg biotin, 20 µg thiamine.HCl, 1.0 mg $FeSO_4.7H_2O$, 1.0 mg $MnSO_4.7H_2O$, 40 mg L-tyrosine, 40 mg DL-methionine, 3.0 ml soy protein acid-hydrolyzate, 1.2 g fumaric acid, 0.3 ml acetic acid, and 5.0 g calcium carbonate, and adjusted to pH 7.0. 20 ml Batches of the medium in 500 ml flasks were inoculated with seed cultures of the strains of B.lactofermentum listed in Table 6 and cultured at 30°C with shaking for 72 hours. The culture medium for strain AJ 3699 additionally contained 10 mg/dl L-tryptophan. The broths were then analyzed for their phenylalanine contents, also listed in the Table. Phenylalanine was recovered from the cultures of B.lactofermentum AJ 3437 and AJ 3699 in crystalline form by centrifuging each broth to remove cells and other solids, passing the cell-free liquid over an ion exchange resin, Diaion SK-1, eluting the adsorbed phenylalanine with ammonium hydroxide solution, and adjusting the pH of the eluate to the isoelectric point of phenylalanine (pH 5.5), as is conventional in itself. The yield was 65 percent of the phenylalanine originally found in the broth.

TABLE 6

| Strain | Phenylalanine, g/dl |
|---|---|
| No. 2256 | 0.00 |
| AJ 3435 | 0.42 |
| AJ 3436 | 0.71 |
| AJ 3432 | 1.74 |
| AJ 3437 | 2.20 |
| AJ 3699 | 2.31 |

EXAMPLE 4

Brevibacterium lactofermentum AJ 3436 and AJ 3437 were cultured separately with shaking at 31.5°C for 16 hours in an aqueous culture medium containing, per deciliter, 3 g glucose, 0.1 g $KH_2PO_4$, 0.04 g $MgSO_4.7H_2O$, 1 mg $FeSO_4.7H_2O$, 1 mg $MnSO_4.4H_2O$, 40 mg L-tyrosine, 40 mg DL-methionine, 5 ml soy protein acid hydrolyzate, 10 γbiotin, 30 γthiamine.HCl, and 0.2 g urea.

An aqueous fermentation medium was prepared to contain, per deciliter, 0.4 g ammonium acetate, 0.4 g sodium acetate, 0.1 g $KH_2PO_4$, 0.04 g $MgSO_4.7H_2O$, 1 mg $FeSO_4.7H_2O$, 1 mg $MnSO_4.4H_2O$, 40 mg L-tyrosine, 40 mg DL-methionine, 5 ml soy protein acid hydrolyzate, 10 γbiotin, 30 γthiamine.HCl, and 0.2 g urea, and adjusted to pH 7.0. 300 ml Batches of the fermentation medium in 1 liter fermentors were sterilized with steam and inoculated each with 15 ml of the previously prepared seed cultures of strains AJ 3436 and 3437 respectively.

The fermentation was carried out at 31.5°C with agitation at 1200 r.p.m. and aeration of 300 ml/min. Starting three hours after inoculation, 70% acetic acid and gaseous ammonia were fed to each culture to maintain a pH of 7.0 to 7.7. After 48 hours cultivation, strain AJ 3437 had consumed 57 g acetic acid and produced 2.01 g/dl L-phenylalanine. Strain AJ 3436, in the same period, consumed 30 g acetic acid and produced 0.75 g/dl phenylalanine.

EXAMPLE 5

The parent strain B.flavum No. 2247 and the four mutant strains described in Example 2 were cultured in the manner described in Example 3, and the amounts of phenylalanine accumulated in each broth after 72 hours were determined. They are listed in Table 7.

TABLE 7

| Strain | Phenylalanine, g/dl |
|---|---|
| No. 2247 | 0.00 |
| AJ 3695 | 0.23 |
| AJ 3696 | 1.20 |
| AJ 3697 | 1.40 |
| AJ 3698 | 2.01 |

EXAMPLE 6

Brevibacterium lactofermentum AJ 3436 and AJ 3437 were each cultured at 30°C with shaking for 18 hours in an aqueous medium containing, per deciliter, 3 g glucose, 0.1 g $KH_2PO_4$, 0.04 g $MgSO_4.7H_2O$, 1 mg $FeSO_4.7H_2O$, 1 mg $MnSO_4.4H_2O$, 5 ml soy protein acid hydrolyzate, 20 γbiotin, 30 γthiamine.HCl, and 0.3 g urea.

An aqueous fermentation medium was prepared to contain, per deciliter, 1.5 g ethanol, 0.5 g $(NH_4)_2SO_4$, 0.1 g $KH_2PO_4$, 0.04 g $MgSO_4.7H_2O$, 1 mg $FeSO_4.7H_2O$, 2 ml soy protein acid hydrolyzate, 40 mg L-tyrosine, 40 mg DL-methionine, 20 γbiotin, 30 γthiamine.HCl, and adjusted to pH 7.2.

Batches of the fermentation medium were inoculated with the previously prepared seed cultures and held at 31°C for 48 hours while the pH was maintained at 7.0 to 7.5 by means of gaseous ammonia, and an ethanol concentration of at least 0.1 g/dl was maintained by periodic additions of the alcohol.

The final phenylalanine concentration was 1.95 g/dl in the broth from strain AJ 3437, and 0.83 g/dl in the broth of strain AJ 3436.

What is claimed is:

1. A method of producing L-phenylalanine which comprises:
   a. culturing an L-phenylalanine-producing mutant of a parent strain of Brevibacterium under aerobic conditions in an aqueous fermentation medium until a substantial amount of L-phenylalanine accumulates in said medium,
      1. said mutant being capable of vigorous growth on a culture medium containing enough of a tryptophan analog substantially completely to inhibit growth of said parent strain,
      2. said mutant being further capable of vigorous growth on a culture medium containing enough of a phenylalanine analog substantially completely to inhibit growth of said parent strain,
      3. said mutant requiring L-tyrosine for the growth thereof; and
   b. recovering the accumulated L-phenylalanine from said fermentation medium.

2. A method as set forth in claim 1, wherein said mutant is a strain of Brevibacterium lactofermentum or Brevibacterium flavum.

3. A method as set forth in claim 2, wherein said mutant further requires L-tryptophan for said growth thereof.

4. A method as set forth in claim 3, wherein said mutant is Brevibacterium lactofermentum FERM P-2476.

5. A method as set forth in claim 2, wherein said mutant is Brevibacterium lactofermentum FERM P-1914.

6. A method as set forth in claim 2, wherein said mutant is Brevibacterium flavum FERM P-2475.

7. A method as set forth in claim 1, wherein said tryptophan analog is 5-methyltryptophan and said phenylalanine analog is p-fluorophenylalanine.

8. A method as set forth in claim 1, wherein said parent strain does not require tyrosine for the growth thereof and is incapable of producing phenylalanine during said growth.

* * * * *